Dec. 31, 1935.  F. C. CRAWFORD  2,025,727
METHOD OF MAKING JOINTS
Filed March 6, 1933   2 Sheets-Sheet 1
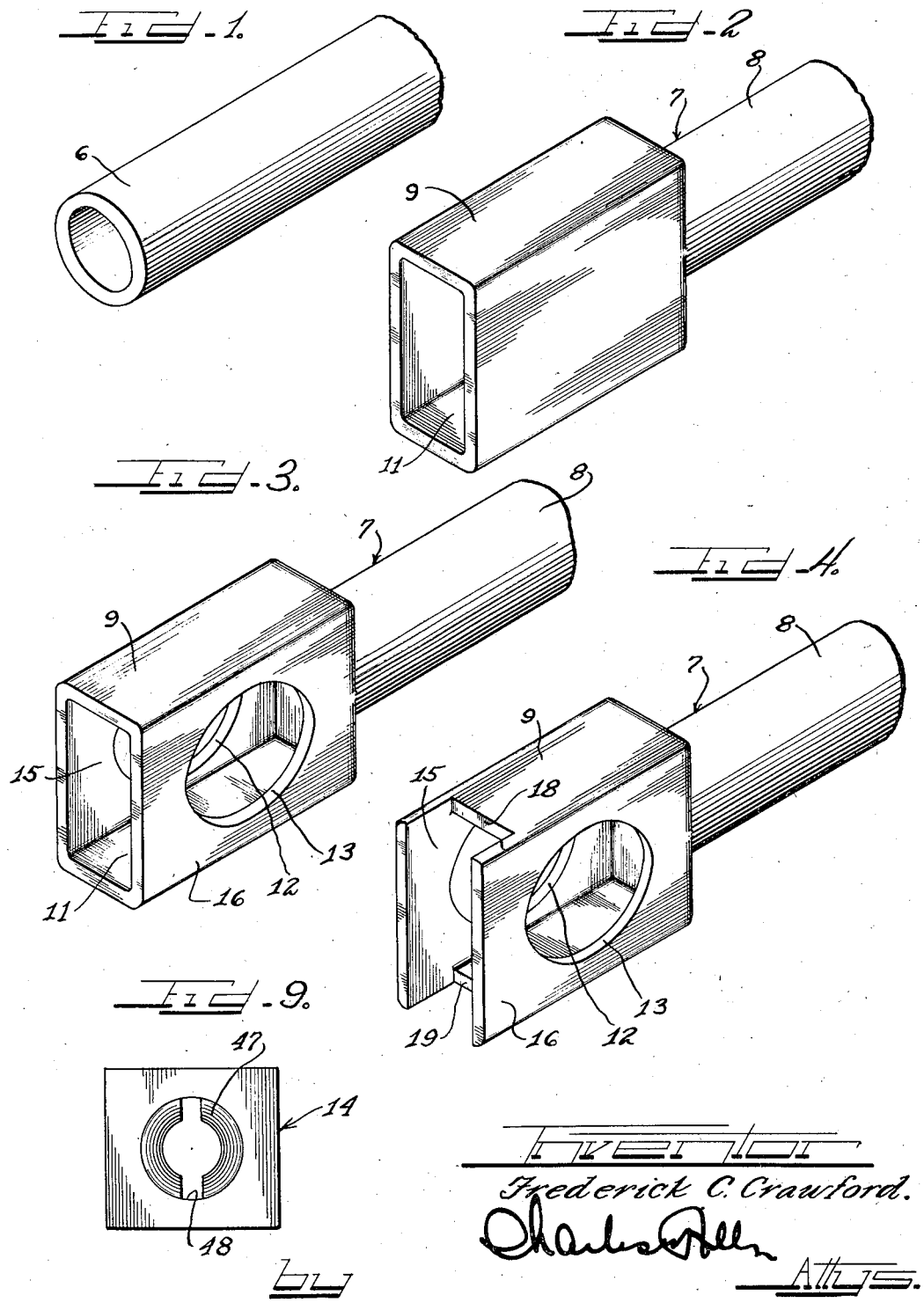
Inventor
Frederick C. Crawford.
by Charles Allen
Attys.

Dec. 31, 1935.   F. C. CRAWFORD   2,025,727
METHOD OF MAKING JOINTS
Filed March 6, 1933   2 Sheets-Sheet 2
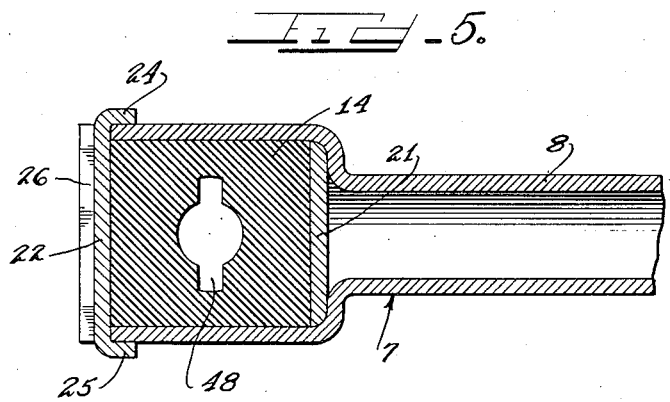
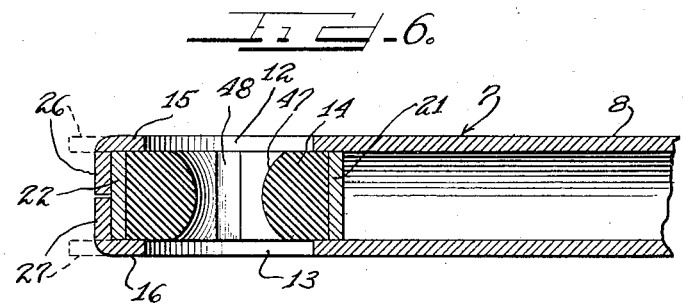
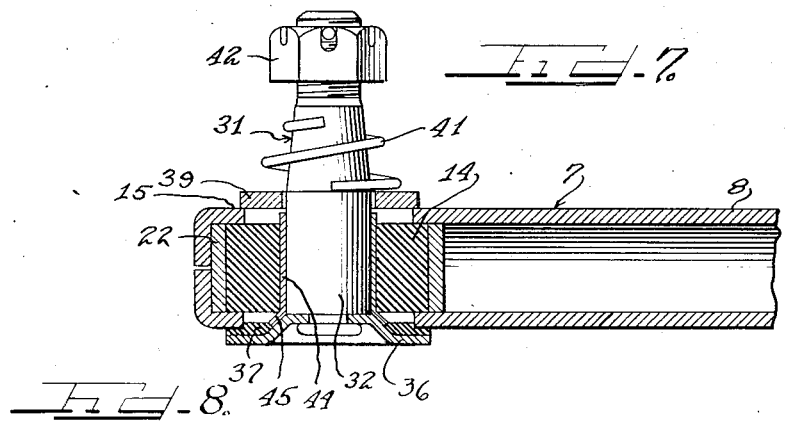
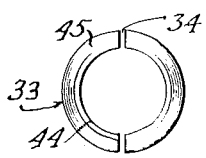
Inventor.
Frederick C. Crawford.

Patented Dec. 31, 1935

2,025,727

UNITED STATES PATENT OFFICE 2,025,727

METHOD OF MAKING JOINTS

Frederick C. Crawford, Detroit, Mich., assignor to Thompson Products, Incorporated, Cleveland, Ohio, a corporation of Ohio Application March 6, 1933, Serial No. 659,773

10 Claims. (Cl. 29—152)

This invention relates to an improved joint construction method and will be described as incorporated in devices suitable for use in steering mechanisms for automotive vehicles.

An object of this invention is to provide a method of making an improved joint of the class identified which is extremely durable, simple of construction, and which is designed to be automatically adjusted to compensate for wear of the relatively movable engaging friction surfaces.

Another object is to provide a method of making such a joint wherein a rubber packing or the like is employed for exerting a radial compression upon a metallic sleeve to maintain it in constant and substantially uniform frictional engagement with a bearing portion of one of the relatively movable joint members, to obviate the necessity of service or manual adjustment.

A further object is the provision of a novel method of producing a socket element for the joint from a single piece of tubular metal, by expanding, cutting and bending operations.

Other objects and advantages of this invention will become apparent to those skilled in the art from the following detail description with reference to the accompanying drawings.

On the drawings:

Figure 1 is a perspective view of a tubular metal member from which a socket element incorporated in this invention may be formed.

Figures 2, 3, and 4 illustrate progressive steps in the forming of the metal tube into a socket element.

Figure 5 is a longitudinal section through the element as shown constructed in Figure 4 and additionally illustrating a rubber bushing in the housing together with means for holding it in place.

Figure 6 is a sectional view through the same mechanism as illustrated in Figure 5 except that it is taken at a 90° angle from that shown in Figure 5 and illustrating an additional step for the completion of the socket element.

Figure 7 is a longitudinal section through an assembled device showing the mechanism illustrated in Figure 6 together with a stud and associated elements applied to the socket element for completing the joint.

Figure 8 is a top plan of a metal sleeve incorporated in the invention, and

Figure 9 is a top plan of the rubber bushing employed in this device and also illustrated in Figures 5, 6, and 7.

As shown on the drawings:

This method will be best understood by a reference to the drawings showing the steps used in fabricating the joint. As illustrated in Figure 1, numeral 6 designates a metal tube adapted to be upset and expanded by any suitable well-known means for forming a socket element designated as a whole by numeral 7 and comprising a tubular shank at one end and a box-like housing 9 at the other end. For purposes of illustration the box-like housing 9 is shown to be rectangular in cross section; however, this invention is not limited to any specific shape or form of the housing. The housing 9 is open at one end as indicated at 11 for the reception of the bushing 14 illustrated in Figure 9. After the necessary expanding operations have been completed for forming the housing 9, aligned openings 12 and 13 are formed in oppositely disposed side walls 15 and 16 to receive therethrough another element of the joint. Figure 4 illustrates a further operation in which marginal portions of the top and bottom walls have been cut away forming recesses 18 and 19 at the open end. The next step is illustrated in Figure 5 which shows the rubber bushing 14 in place. A plate 21 is seated in the bottom or end of the socket opposite the open end for closing communication between the housing and the hollow tubular shank 8. The bushing 14 is seated tightly against the plate 21 and is confined by a closure plate 22 seated in the recesses 18 and 19 and provided with flanges 24 and 25 engaging at opposite edges of the housing to prevent displacement. The next operation comprises bending the marginal edges 26 and 27 of the sides 15 and 16 over upon the plate 22, thereby forming inwardly extending flanges for securely confining the plate 22 together with the bushing 14 and the plate 21 in position.

The completed joint illustrated in Figure 7 additionally includes a stud 31 comprising a cylindrical bearing portion 32 disposed within the bushing 14. Interposed between the bushing 14 and the bearing portion 32 of the stud, is a metallic sleeve 33 having a cylindrical bearing portion 44 and a flared base flange 45. The sleeve 33 is preferably split as indicated at 34 in order that it may be contracted by force exerted upon it by the bushing 14 for constantly maintaining the bearing portion 44 of the sleeve in firm engagement with the cylindrical bearing portion 32 of the stud 31 to compensate for wear of the relatively moving friction surfaces and to obviate the necessity of manual adjustments or repair of the joint.

Upon the lower end of the stud is secured a closure plate 36 for the opening 13 in the side wall 16. A resilient washer 37 is interposed between the margins of the plate 36 and the wall 16, to facilitate limited universal movement of the stud 31 relative to the socket element 7. A washer 39 disposed about the intermediate portion of the stud, normally closes the opening 12 thru the side wall 15. It will be understood that when this device is in use, a suitable actuating arm or element to be actuated by the stud may be fitted upon the upper portion of the stud and confined between the coil spring 41 and the nut 42, the spring 41 also serving to resiliently maintain the washer 39 in position.

The bushing 14 is preferably of a size and shape to snugly fit the housing 9 and is provided with a central opening through which the stud 31 is adapted to be inserted. The central opening of the bushing 14 is preferably provided with a plurality of axially convex sectors 47 as shown in Figures 6 and 9, which sectors are spaced from each other circumferentially providing axially extending grooves or recesses preferably of a channel shape as indicated at 48. Upon insertion of the stud 31, the material of the bushing is deformed so that it flows circumferentially and enters the recesses 48. This construction obviates axial displacement of the bushing material and reserves the material at a point where it is most available for compensating for wear on the sleeve 33 and the stud 31. By this construction it is possible to maintain a substantially constant pressure on the sleeve 33 and insure a uniform operation of the joint for a long period of time without perceptible deterioration.

From the foregoing description it will be understood by those skilled in the art that the invention is not limited to the specific illustration as shown in the drawings, but is susceptible of various forms and modifications without departing from the principle thereof. It is desired therefore that the patent to be granted hereon shall not be restricted in any manner except as necessitated by the prior art.

I claim as my invention:

1. The method of making a socket element for a joint of the class described which includes expanding an end portion of a metal tube to form a bushing housing integral with the tube and having an open end, making openings through opposite side walls of the housing for receiving an element of the joint, placing a cover element on the open end of the housing, and bending portions of the marginal edge of the housing over the cover element to hold the same in place.

2. The method of making a socket element for a joint of the class described which includes expanding an end portion of a metal tube to form a bushing housing integral with the tube and having an open end, making openings through opposite side walls of the housing for receiving an element of the joint, and inserting a joint bushing in the housing through the open end, placing a cover element on the open end of the housing and bending portions of the marginal edge of the housing over the cover element to hold it in place.

3. The method of making a socket element for a joint of the class described which includes expanding an end portion of a metal tube to form a housing integral with the tube and having an open end, forming openings through opposite side walls of the housing for receiving an element of the joint, cutting away marginal portions of the housing at the open ends, inserting a joint bushing in the housing through the open end, placing a cover element on the open end of the housing and bending portions of the marginal edge of the housing over the cover element to hold it in place.

4. The method of making a socket element for a joint of the class described which includes expanding an end portion of a hollow metal element to form a housing thereon open at one end and communicating with the unexpanded portion of the metal element at the other end, providing oppositely disposed openings through the housing to accommodate a stud for the joint, inserting a member to close communication between the housing and the unexpanded portion of the hollow metal element, inserting a joint bushing in the housing, and bending portions of the marginal edge of the housing adjacent the open end to a position closing the open end.

5. The method of making a socket element for a joint of the class described which includes expanding an end portion of a hollow metal element to form a housing thereon open at one end and communicating with the unexpanded portion of the metal element at the other end, providing oppsitely disposed openings through the housing to accommodate a stud for the joint, inserting a member to close communication between the housing and the unexpanded portion of the hollow metal element, inserting a joint bushing in the housing, placing a cover over the open end of the housing and bending marginal portions of the housing over the cover to hold it in position.

6. The method of making a socket element for a joint of the class described, which includes providing a hollow metal member with a housing at one end, with one open end in the housing, providing openings for a stud through opposite sides of the housing, inserting a bushing in the housing, and providing closure means for the open end of the housing to hold the bushing in position.

7. The method of making a socket element for a joint of the class described, which includes providing a hollow metal member with a housing at one end, with one open end in the housing, providing openings for a stud through opposite sides of the housing, inserting a bushing in the housing, cutting away portions of the marginal edges of the housing on oppositely disposed walls, placing a cover element on the open end with the sides of the cover seated on the housing where the edges were cut away and bending other marginal portions of the housing inwardly into engagement with the cover to secure it in position.

8. The process of making a socket element for joints which comprises expanding an end portion of a metal tube to form a box-like housing with an open end, forming an opening in at least one wall of the housing for receiving therethrough an element of the joint, cutting away opposite side wall portions of the housing at their marginal edges to define flanges of the marginal ends of the other side walls and bending said flanges to partially close the open end of the housing.

9. In the method of making a socket element for a joint of the class described which comprises expanding an end portion of a metal tube to form an enlarged housing having side and edge walls and a free open end, forming aligned openings through opposite side walls of the housing and cutting away marginal portions of the edge walls at the open end of the housing for defining integral flanges extending from the side wall and adapted to be subsequently bent inwardly for closing the open end of the housing.

10. The method of making a socket element for a joint of the class described which comprises expanding and shaping the end portion of a metal tube to form an enlarged box-like housing having a pair of flat side walls and a pair of flat edge walls and an open end, providing an opening through at least one of the side walls for receiving therethrough an element of the joint, cutting away marginal portions of one pair of the walls of the housing at the open end thereof to form laterally extending flanges of the marginal portions of the other pair of walls, and subsequently bending said flanges inwardly to close the open end of the housing.

FREDERICK C. CRAWFORD.